(12) United States Patent
Arai et al.

(10) Patent No.: US 7,873,970 B2
(45) Date of Patent: Jan. 18, 2011

(54) OPTICAL PICKUP DEVICE AND OPTICAL DISC DRIVE APPARATUS

(75) Inventors: Satoshi Arai, Fujisawa (JP); Hiroaki Furuichi, Kawasaki (JP); Yoshio Oozeki, Yokohama (JP); Rika Nomura, Yokohama (JP); Masayuki Okamura, Fujisawa (JP); Kazumi Takahashi, Toyokawa (JP); Mitsuo Satake, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 840 days.

(21) Appl. No.: 11/830,012

(22) Filed: Jul. 30, 2007

(65) Prior Publication Data

US 2008/0052734 A1 Feb. 28, 2008

(30) Foreign Application Priority Data

Aug. 24, 2006 (JP) ............................. 2006-227529

(51) Int. Cl.
*G11B 7/00* (2006.01)
(52) U.S. Cl. .................................... 720/671; 369/44.14
(58) Field of Classification Search ................. 720/671; 369/44.14, 44.15, 44.16, 44.37
See application file for complete search history.

(56) References Cited

U.S. PATENT DOCUMENTS 7,228,553 B2 * 6/2007 Lee et al. .................... 720/683
7,602,678 B2 * 10/2009 Takeo et al. ............... 369/44.15
7,631,321 B2 * 12/2009 Hayashi et al. ............. 720/671
2006/0114769 A1 * 6/2006 Mashiyama et al. ....... 369/44.14
2007/0014205 A1 * 1/2007 Inui ........................ 369/44.14
2008/0031103 A1 * 2/2008 Horinouchi et al. ...... 369/44.37

FOREIGN PATENT DOCUMENTS

| JP | 2006-018978 | 1/2006 |
|---|---|---|
| JP | 2006-024339 | 1/2006 |
| JP | 2006-099814 | 4/2006 |

* cited by examiner

*Primary Examiner*—Angel A. Castro
(74) *Attorney, Agent, or Firm*—Antonelli, Terry, Stout & Kraus, LLP.

(57) ABSTRACT

The present invention provides an optical pickup device employing a disc protector that includes a plurality of first protrusions and at least one second protrusion disposed on the lens holder, wherein the first protrusions are formed by applying a first adhesive to a plurality of areas of a top surface of the lens holder, wherein the first protrusions are arranged at different locations in the tracking direction such that the objective lens is sandwiched between the first protrusions, wherein the at least one second protrusion protrudes is formed by applying a second adhesive to at least one area of the top surface of the lens holder, and wherein tips of the first protrusions are closer to the optical disc than a tip of the at least one second protrusion.

11 Claims, 7 Drawing Sheets

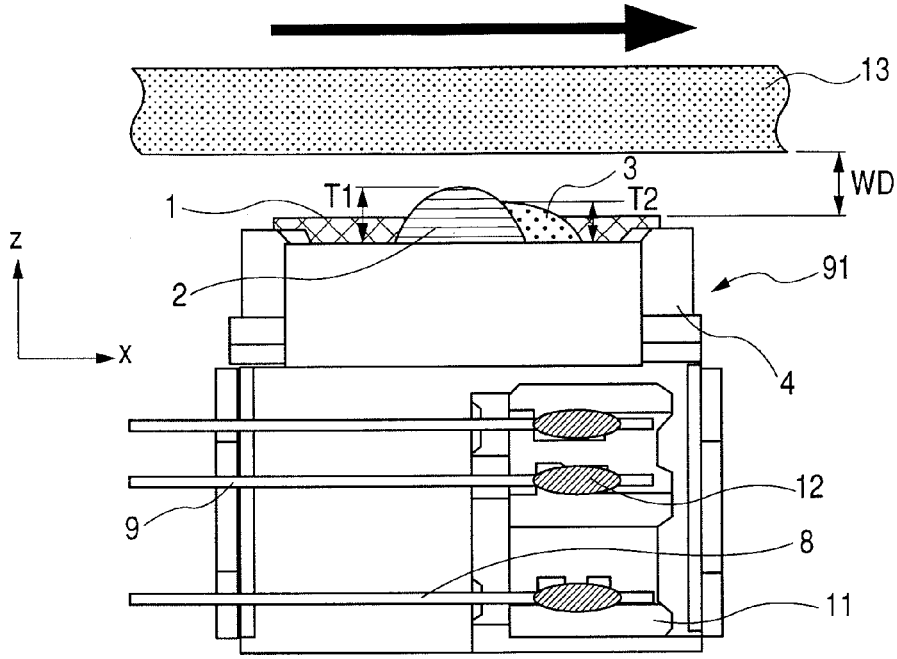
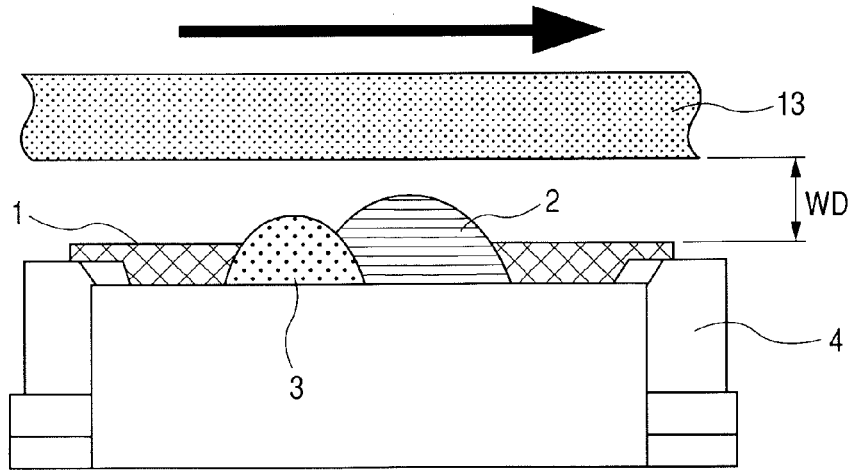

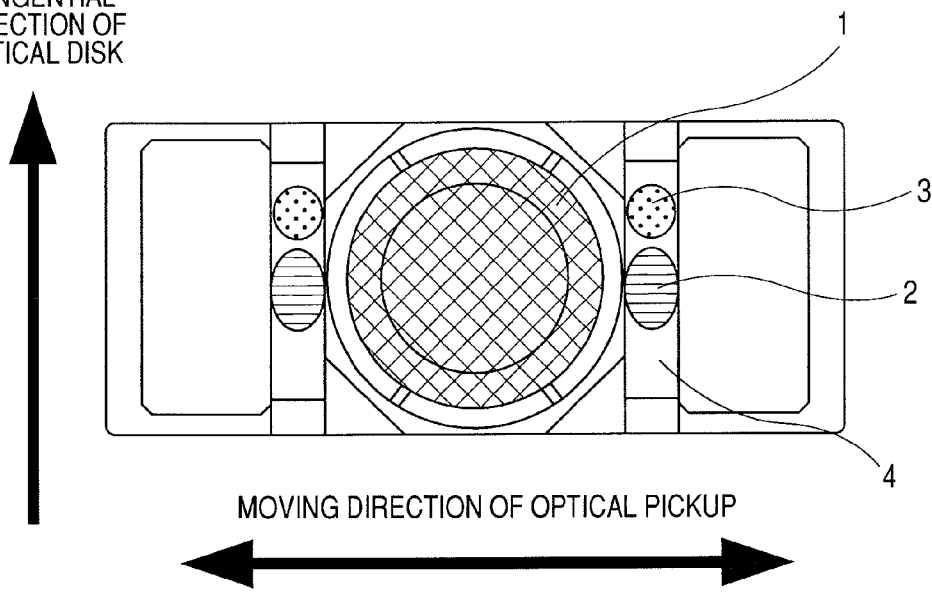
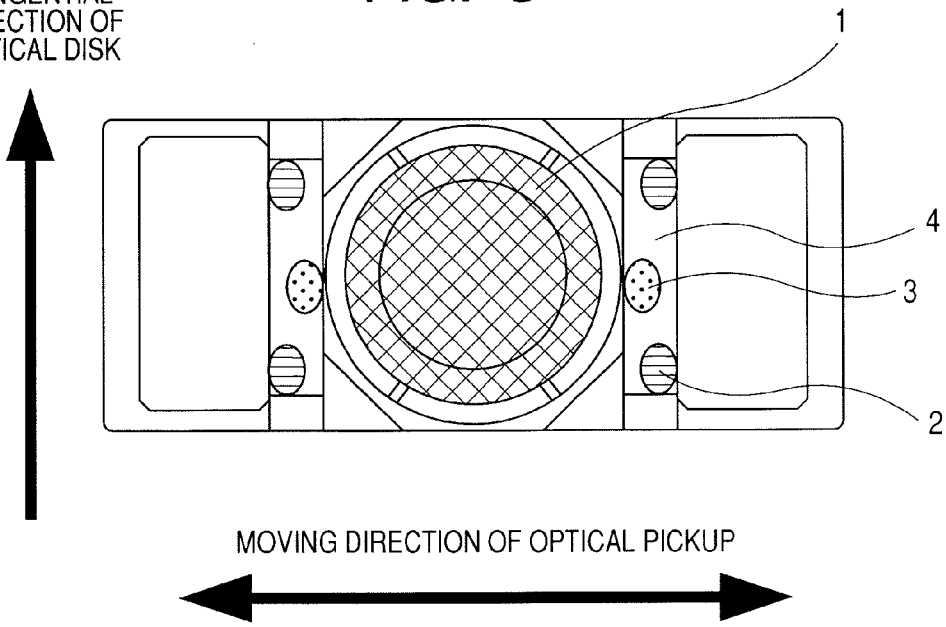

ROTATION TANGENTIAL DIRECTION OF OPTICAL DISK

ROTATION TANGENTIAL DIRECTION OF OPTICAL DISK

OPTICAL PICKUP DEVICE AND OPTICAL DISC DRIVE APPARATUS

The present application claims priority from Japanese application JP2006-227529 filed on Aug. 24, 2006, the content of which is hereby incorporated by reference into this application.

BACKGROUND OF THE INVENTION

1. Field of the Invention

The present invention relates to thin optical pickup devices (sometimes referred to as slim or ultra-slim optical pickup devices) for writing to and reading from an optical disc such as a CD (compact disc), DVD (digital versatile disc), etc., and relates to optical disc drive apparatuses incorporating such a thin optical pickup device. The invention also relates to optical pickup devices for writing to and reading from an optical recording medium such as a Blu-ray disc (for use in a blue semiconductor laser), HD-DVD, etc., and relates to optical disc drive apparatuses incorporating such an optical pickup device.

2. Description of the Related Art

The following describes the inner workings of an optical pickup device for writing to or reading from an optical recording medium such as a CD, DVD, Blu-ray disc (for use in a blue semiconductor laser), HD-DVD, etc. This optical pickup device is incorporated in an optical disc drive apparatus. The light emitted from a light emitting device such as a laser diode is directed to the objective lens through optical components such as various lenses, a prism, mirrors, etc., and focused onto the optical disc. The return light from the optical recording medium (or optical disc) passes through optical components such as the objective lens, various lens, mirrors, etc. and is received by a photodiode which then converts the optical power (or signal) into an electrical signal. In the optical pickup device, the actuator finely adjusts the position of the objective lens to maintain it at a predetermined distance (or working distance, hereinafter referred to as "WD") from the surface of the optical disc, which allows the device to reliably write and read a signal to and from optical disc media conforming to various standards, and even relatively low quality discs having an axial runout.

It should be noted that "half-height type" optical pickup devices, which do not belong to the group of thin optical pickup devices, can be designed to have a sufficient distance between the surface of the optical disc and the surface of the objective lens. This eliminates the need to provide a protector member near the objective lens in such a way that its top is higher than the surface of the objective lens.

However, the recent trend toward thinner personal computers, etc. has resulted in a reduction in the distance between the surface of the optical disc and the surface of the objective lens in each optical disc drive apparatus. This means that the objective lens may collide with the optical disc if the focus servo system does not function as intended or if strong external force is applied to the optical disc drive apparatus. In the worst case, the objective lens or the recording surface of the optical disc may be damaged, making it impossible for the pickup device to read a signal from the disc. In order to prevent this, thin optical pickup devices usually include a protector member that protrudes toward the optical disc such that its tip is closer to the optical disc than the surface of the objective lens.

Such a protector member is made of a special POM (polyoxymethylene) material or a special fluorine-based molding resin material having very high surface slipperiness so as not to damage the surface of the optical disc when the protector member comes into contact with it. More specifically, when the protector member contacts the rotating optical disc, material is readily removed from the surface of the protector member by friction without damaging the surface of the optical disc. Further, even if strong external force is applied to the optical disc drive apparatus or the optical pickup device, the high slipperiness of the surface of the protector member causes the member to slide over the surface of the optical disc, thereby preventing damage to the surface of the optical disc. The lens holder is commonly made of a liquid crystal polymer, which allows for accurate molding.

However, conventional thin optical pickup devices such as that described above are disadvantageous in that the protector member is formed of a special POM material or a special fluorine-based molding resin material (as described above), which results in increased material cost and the need for die replacement during the manufacturing process.

It should be noted that the following patent publications disclose techniques related to optical pickup devices. JP-A-2006-18978 discloses a lens drive mechanism in which the lens protector member protrudes more than the objective lens to prevent contact between the objective lens and the optical disc (or optical recording medium) and thereby prevent damage to the surface of the disc. The lens protector member is made of a UV cure adhesive to avoid an increase in cost and allow the lens drive mechanism to have a simple configuration. JP-A-2006-24339 discloses an optical pickup device in which the lens holder includes a plurality of openings in which lens protectors are to be formed. A resin material such as a UV cure adhesive is injected into selected ones of these openings to form lens protectors and adjust the center of gravity of the moving part at the same time. Further, JP-A-2006-99814 discloses a collision preventing device of an optical pickup device in which at least one molded body having a cushioning coating on its top is implanted in the top peripheral surface of the lens holder holding the objective lens.

SUMMARY OF THE INVENTION

Although the above conventional optical pickup devices have satisfactory performance, it is very difficult to assemble them, that is, their manufacture requires an increased number of processes. Further, a special resin material must be used to form the protector member(s), resulting in increased cost.

In the conventional lens drive mechanism and the conventional optical pickup device disclosed in the above JP-A Nos. 2006-18978 and 2006-24339, the lens protector(s) (a protrusion portion) may be formed of an adhesive. However, adhesives have tackiness and have a high friction coefficient and poor surface slipperiness, as compared to POM and the special fluorine-based resin material described above (which have a low friction coefficient and very high surface slipperiness). It is known in the art that an adhesive with a lower friction coefficient generally has a higher surface hardness and lower tackiness. Therefore, in order to address the above problem, the lens protector may be formed of a single adhesive having a high hardness, low tackiness, and hence a reduced friction coefficient to allow the lens protector to slide over the surface of the optical disc when the lens protector comes into contact with the disc. In this case, however, the adhesive still has a higher friction coefficient than the above special resins (which have a low friction coefficient and very high surface slipperiness). Furthermore, the high hardness of the adhesive (or lens protector) may result in damage to the surface of the optical disc. To avoid this, an adhesive having a reduced hardness may be used. In such a case, however, the adhesive has increased tackiness and hence an increased friction coefficient, resulting in an increase in the frictional force on the adhered portion. Furthermore, if a shock is imparted to the optical pickup device, the lens protector may collide with the lens holder or the objective lens since it has a reduced hardness (as described above), resulting in damage to the lens holder or the objective lens. That is, unlike the above molding resins, no single adhesive can provide both the required surface slipperiness and the required characteristics for collision prevention at the same time.

In order to overcome these problems, at least one molded body may be implanted in the top peripheral surface of the lens holder, and a cushioning coating may be applied over the top of the molded body, as disclosed in the above JP-A-2006-99814. However, like the above POM material and special fluorine-based resin material, such a molded body is very costly, as compared to adhesives, etc., and furthermore is difficult to accurately mount on the lens holder.

The present invention has been devised to solve the above problems. It is, therefore, an object of the present invention to provide a low cost, high reliability optical pickup device employing a disc protector that is formed of only inexpensive adhesives but that has equal or higher functionality than conventional disc protectors and is easy to fabricate. Another object of the present invention is to provide an optical disc drive apparatus incorporating such an optical pickup device.

In order to achieve the above objects, the present invention provides an optical pickup device for writing and reading data to and from an optical disc by means of a laser beam, the optical pickup device comprising: an objective lens for focusing the beam onto the optical disc; a lens holder for holding the objective lens; a moving drive portion for moving the lens holder in a focusing direction and in a tracking direction; and a disc protector (or collision preventing means) including a plurality of first protrusions and at least one second protrusion disposed on the lens holder to prevent the objective lens and the lens holder from contacting the optical disc, wherein the first protrusions protrude toward the optical disc and are formed by applying a first adhesive to a plurality of areas of the lens holder, the first protrusions being arranged at different locations in the tracking direction such that the objective lens is sandwiched between the first protrusions, wherein the at least one second protrusion protrudes toward the optical disc and is formed by applying a second adhesive to at least one area of the lens holder, wherein a tip of the at least one second protrusion is closer to the optical disc than a top end or surface of the objective lens and a top end or surface of the lens holder, and wherein tips of the first protrusions are closer to the optical disc than the tip of the at least one second protrusion.

According to another aspect of the present invention, the at least one second protrusion has a hardness or a modulus of elasticity higher than that of the first protrusions and lower than that of polycarbonate. According to yet another aspect of the present invention, at least a portion of the at least one second protrusion is in contact with or adhered to at least a portion of one of the first protrusions. According to still another aspect of the present invention, at least a portion of the at least one second protrusion is in contact with or adhered to at least an upstream or downstream portion of one of the first protrusions relative to a tangential direction of rotation of the optical disc.

According to still another aspect of the present invention, a concave portion or a convex portion is formed in either the plurality of areas to which the first adhesive is applied, or the at least one area to which the second adhesive is applied, or both, the concave portion being filled with a respective one of the first and second adhesives. According to a further aspect of the present invention, the concave or convex portion extends in the tracking direction and penetrates through opposing sides of the lens holder that sandwich the objective lens therebetween (the concave or convex portion being exposed at these opposing sides). According to a still further aspect of the present invention, the maximum depth of the concave portion is larger than the maximum width of the concave portion, the maximum depth being measured in a direction perpendicular to the plane of the optical disc, the maximum width being measured in the tangential direction of rotation of the optical disc.

According to another aspect of the present invention, the first adhesive is a condensation polymerized silicone adhesive or a UV cure adhesive. According to yet another aspect of the present invention, the second adhesive is a UV cure adhesive or a thermosetting adhesive. According to still another aspect of the present invention, the first and second adhesives do not contain a filler having a higher hardness than polycarbonate.

Yet another aspect of the present invention provides an optical disc drive apparatus comprising the above optical pickup device.

The present invention enables one to easily form a disc protector (or contact preventing member) of an optical pickup device at low coat. The disc protector prevents damage to the objective lens and the optical disc when the focus servo system of the actuator portion does not function as intended or when a strong force is applied to the optical pickup device. This allows a significant reduction in the cost of the optical pickup device and hence the cost of optical disc drive apparatuses incorporating such an optical pickup device.

BRIEF DESCRIPTION OF THE DRAWINGS

FIG. 2 is a cross-sectional view of the first example of the actuator portion of the first embodiment shown in FIG. 1;

FIG. 3 is a cross-sectional view of the lens holder portion of a second example of the actuator portion of the first embodiment;

FIG. 4 is a top view of the lens holder portion of a third example of the actuator portion of the first embodiment;

FIG. 5 is a top view of the lens holder portion of a fourth example of the actuator portion of the first embodiment;

DETAILED DESCRIPTION OF THE PREFERRED EMBODIMENTS

Optical pickup devices according to the preferred embodiments of the present invention will now be described with reference to the accompanying drawings.

Figure 12:
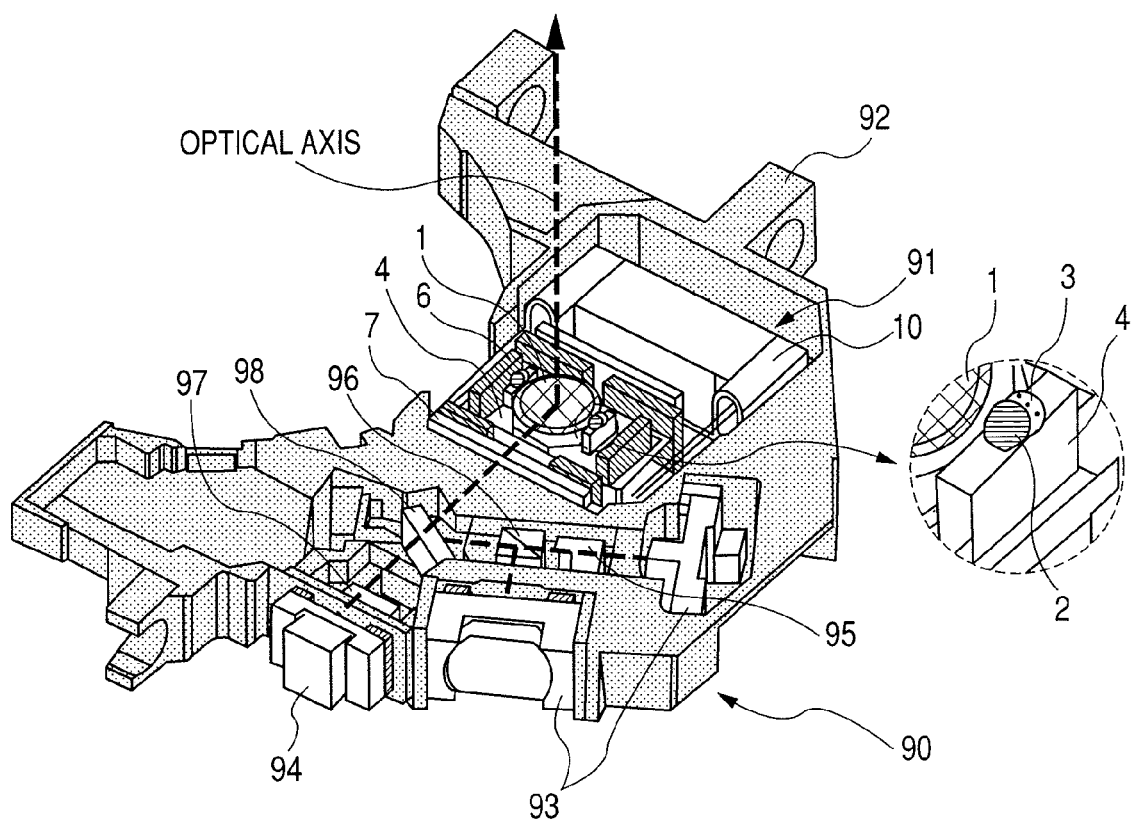
FIG. 12 is a perspective view of an optical pickup device according to the present invention.

FIG. 12 shows an optical pickup device 90 according to the present invention. The optical pickup device 90 writes and reads data to and from an optical disc 13 by directing a laser beam to the disc and receiving the reflected beam. The optical pickup device 90 includes: an objective lens 1 for focusing the laser beam into a predetermined diameter spot on the optical disc and receiving the reflected beam; an actuator portion 91 for mounting the objective lens 1 thereon and moving it in both the tracking and focusing directions; an optical system including a plurality of optical components such as an attachment lens 95, a prism 96, a detection lens 97, and a beam splitter 98; and a pickup base (or chassis) 92 on which the above components are mounted and which can be moved in a radial direction of the optical disc.

More specifically, the optical pickup device 90 includes: first and second laser diodes 93; the objective lens 1 for directing the laser beam emitted from the first or second laser diode 93 to the optical disc 13; the actuator portion 91 for moving the objective lens 1 in both the focusing and tracking directions; a photodiode 94 for receiving the reflected beam from the optical disc 13; and the plurality of optical components (including the attachment lens 95, the prism 96, the detection lens 97, the beam splitter 98, etc.) through which the laser beam emitted from the first or second laser diode 93 passes to the objective lens 1 and through which the reflected beam from the optical disc 13 passes from the objective lens 1 to the photodiode 94.

Figure 1:
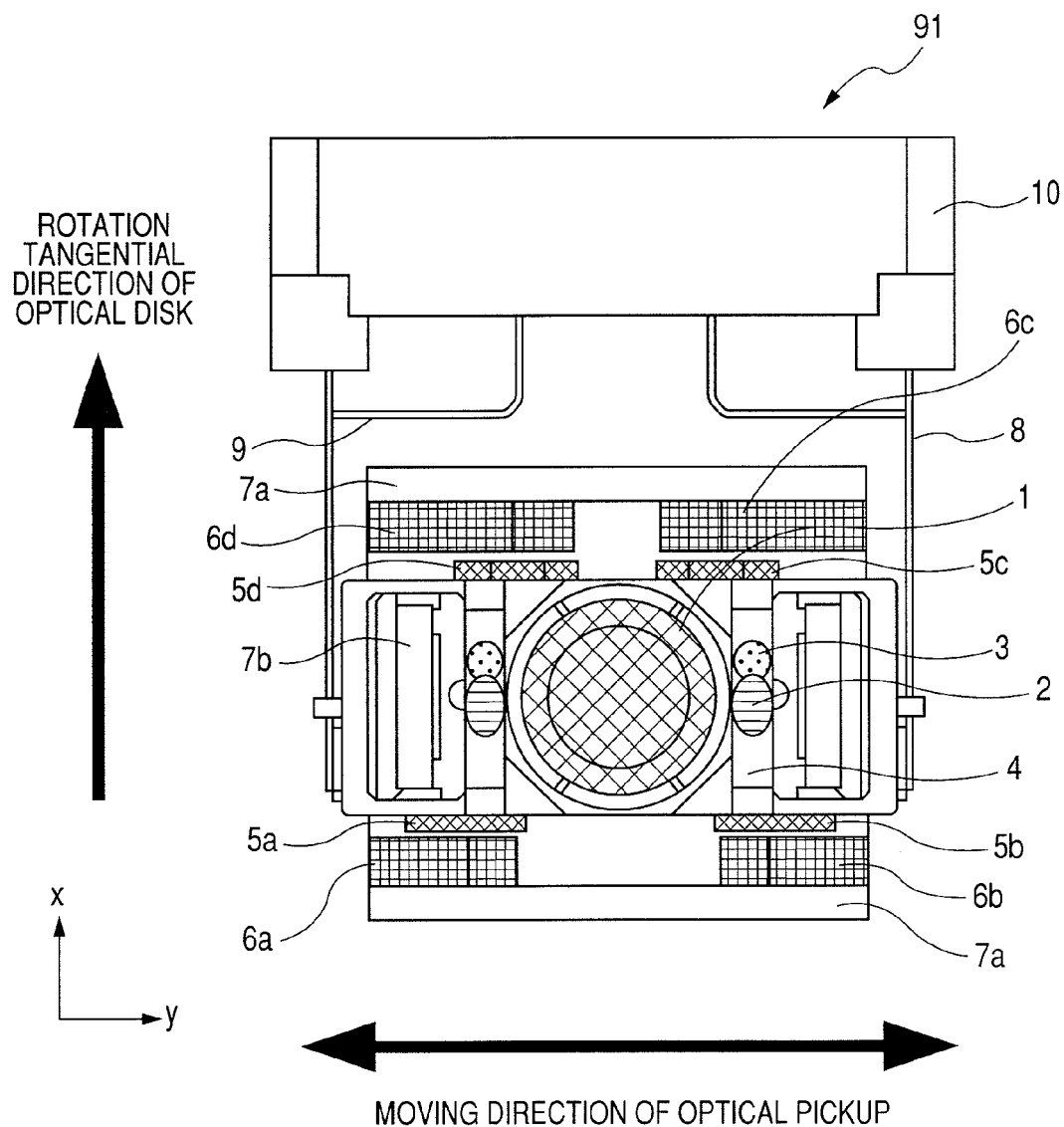
FIG. 1 is a top view of a first example of the actuator portion of an optical pickup device according to a first embodiment of the present invention.

The actuator portion 91, which is a moving drive portion for finely adjusting the position of the objective lens in the three-dimensional directions (or in the tracking and focusing directions), has a configuration as shown in FIGS. 1 and 2. Referring to FIGS. 1 and 2, the x-axis direction coincides with the tangential direction of rotation of the optical disc 13, the y-axis direction coincides with the direction of movement of the optical pickup device 90 (i.e., the tracking direction or the radial direction of the optical disc 13), and the z-axis direction coincides with the focusing direction, or the direction of the optical axis of the objective lens 1. The actuator portion (or objective lens drive device) of the optical pickup device of the present invention primarily includes the objective lens 1, a lens holder 4, an AF coil (not shown), TR coils 5a to 5d, magnets 6a to 6d, yoke plates 7a and 7b, a suspension wire 8, a T wire 9, and a dumping holder 10. The lens holder 4 for holding the objective lens 1 is formed of a material such as a liquid crystal polymer which allows for accurate molding. The focusing coil (AF coil), or drive coil, is wound around the lens holder 4, and the four tracking coils (TR coils) 5a to 5d are also attached to the lens holder 4. The lens holder 4 is attached to the dumping holder 10 by conductive supporting wire members (i.e., the suspension wire 8 and the T wire 9). It should be noted that the moving part (of the actuator portion 91) includes: the objective lens 1; the lens holder 4 for holding the objective lens 1; the AF coil (not shown) wound around the lens holder 4; and the four TR coils 5a to 5d attached to the lens holder 4. The permanent magnets 6a to 6d having a magnetization direction coincident with the x-axis direction (as viewed in FIG. 1) are fixed to the outer yoke 7a of a magnetic material on the opposing sides of the moving part that extend in the tracking direction. The inner yoke 7b of a magnetic material extends along the opposing inner sides of the focusing coil (AF coil) from the bottom of the outer yoke 7a. The magnetic flux from the permanent magnets 6a to 6d flows through the inner yoke 7b and the outer yoke 7a, which form a magnetic circuit. The permanent magnets 6a and 6b are disposed on both sides of one side of the moving part that extends in the tracking direction (i.e., the y-axis direction as viewed in FIG. 1) and spaced from each other. On the other hand, the permanent magnets 6c and 6d are disposed on both sides of the other opposing side of the moving part that extends in the tracking direction and also spaced from each other. The permanent magnets 6c and 6d are spaced a smaller distance from the vertical center line (as viewed in FIG. 1) of the moving part than the permanent magnets 6a and 6b. Thus, the permanent magnets 6a and 6b face the coils TR 5a and 5b, respectively, which are disposed on both sides of the one side of the moving part and spaced from each other. On the other hand, the permanent magnets 6c and 6d face the TR coils 5c and 5d, respectively, which are disposed on both sides of the other opposing side of the moving part and spaced from each other. The TR coils 5c and 5d are spaced a smaller distance from the vertical center line (as viewed in FIG. 1) of the moving part than the TR coils 5a and 5b.

The N-pole ends of the permanent magnets 6a to 6d face the focusing coil, while their S-pole ends face the outer yoke 7a. With this arrangement, when a current is passed through the focusing coil (AF coil) electrically connected to the printed board 11 by the T wire 9 and solder 12, the focusing coil (AF coil) produces a force on the moving part to move it in the z-axis direction (i.e., the focusing direction). On the other hand, when a current is passed through the tracking coils (TR coils) 5a to 5d electrically connected to the printed board 11 by the suspension wire 8 and solder 12, the tracking coils 5a to 5d produce a force on the moving part to move it in the y-axis direction (i.e., the tracking direction).

It should be noted that the present invention is not limited to the actuator portion of the optical pickup device described above.

A novel feature of the actuator portion of the optical pickup device 90 of the present invention will now be described. (This actuator portion is a moving drive device for finely adjusting the position of the objective lens in the three-dimensional directions, or in the tracking and focusing directions, as described above.) A novel disc protector (a contact preventing member) is provided on the top surface of the lens holder 4 of a liquid crystal polymer, etc. to prevent the objective lens 1 and the lens holder 4 from contacting the rotating optical disc 13. This disc protector includes first protrusions 2 and one or more second protrusions 3 that protrude toward the optical disc 13 (upward). The second protrusions 3 have a smaller height than the first protrusions 2. The first protrusions 2 are formed of a first adhesive and have a height (or thickness) T1 of approximately 0.25 mm. The second protrusions 3 are formed of a second adhesive and have a height (thickness) T2 of approximately 0.1 mm. These protrusions function as contact preventing means as follows. If the lens holder 4 cannot maintain within a working distance (WD) of approximately 0.6-0.8 mm from the optical disc 13 (for example, as a result of the fact that tacking has failed during the focusing operation), the first protrusions 2 contact softly with the optical disc 13 (without damaging the surface of the optical disc 13) to stop the motion of the lens holder 4 toward the optical disc 13, thereby preventing the objective lens 1 and the lens holder 4 from contacting the surface of the optical disc 13. Further, in a result of that a strong shock is imparted to the optical disc drive apparatus, if the first protrusions 2 are elastically deformed by collision with the optical disc 13. Even in such a case, it is necessary to prevent the objective lens 1 and the lens holder 4 from contacting the surface of the optical disc 13, by the second protrusions 3. To achieve these functions, the first adhesive, which forms the first protrusions 2, must be made of a material that allows for accurate coating (an optimum thickness), and must have a lower hardness (e.g., a Shore A hardness of approximately 50 or less) or a lower modulus of elasticity (e.g., approximately 30 MPa or less) than the second adhesive so as to contact softly with the surface of the optical disc 13. On the other hand, the second adhesive, which forms the second protrusions 3, must have a hardness (e.g., a Shore D hardness of approximately 70 or less) higher than that of the first adhesive and lower than that of polycarbonate, or must have a lower modulus of elasticity (e.g., approximately 800 MPa or less) than polycarbonate.

It should be noted that the first and second adhesives, which form the first and second protrusions, respectively, must have a lower hardness than the material (polycarbonate) of the optical disc 13 and than the lens holder 4 and the objective lens 1. The first protrusions 2 formed of the first adhesive protrude toward the optical disc 13 (upward) and have a height (or thickness) T1 of approximately 0.25 mm. The second protrusions 3 formed of the second adhesive also protrude toward the optical disc 13 and have a height (or thickness) T2 of approximately 0.1 mm. The second protrusions 3 must be lower in height than the first protrusions 2, but their tops must be higher than the top surfaces of the objective lens 1 and the lens holder 4. It should be noted that when the first protrusions 2 and the second protrusions 3 contact or collide with the optical disc 13, material may be removed from the surfaces of these protrusions by friction, etc. In order to prevent this removed material from being scattered and attaching to the objective lens 1, there must be at least two first protrusions 2 and at least two second protrusions 3 arranged in the direction of movement of the optical pickup (the y-axis direction or the tracking direction) such that the objective lens 1 is sandwiched both between the first protrusions 2 and between the second protrusions 3.

The first protrusions 2 and the second protrusions 3 are formed by applying the first and second adhesives respectively by using a dispenser (which is used to supply a fixed amount of adhesive). Therefore, each protrusion can be formed to an optimum height simply by adjusting the pressure and the discharge time of the dispenser. It should be noted that either of the first and second protrusions can be formed first.

It should be further noted that the actuator portion 91 is fixed to the chassis (or optical pickup case) 92 by a bonding material such as an adhesive. The chassis 92 is formed by die-casting or molding a material predominantly composed of Zn, Mg, Al, or PPS (polyphenylene sulfide).

Thus, the optical pickup device 90 of the present invention includes a disc protector for preventing contact between the actuator portion 91 and the rotating optical disc 13. This disc protector includes first protrusions 2 formed of a first adhesive and second protrusions 3 formed of a second adhesive. The first protrusions 2 function as collision preventing means as follows. If the lens holder 4 cannot maintain within a working distance (WD) from the optical disc 13 (for example, as a result of the fact that tracking has failed during the focus operation), the first protrusions 2 contact softly with, the optical disc 13 (without damaging the surface of the optical disc 13) to stop the motion of the lens holder 4 toward the optical disc 13. To achieve this function, the first adhesive, which forms the first protrusions 2, preferably has a low hardness (e.g., a Shore A hardness of approximately 50 or less) or a low modulus of elasticity (e.g., approximately 30 MPa or less), as described above. Further, the first adhesive must allow for accurate coating to form the first protrusions 2 to an optimum height (or thickness). Therefore, the first adhesive is preferably a condensation-polymerized silicone adhesive, which allows for accurate coating and which has low tackiness and hardens on exposure to moisture in the atmosphere, or alternatively a UV cure adhesive (acrylic- or epoxy-based). It should be noted that thermosetting adhesives are not suitable to form the first protrusions 2, since these adhesives are hardened by application of heat after they are applied. More specifically, the viscosity of thermosetting adhesives decreases with temperature, which makes it difficult to accurately form the first protrusions 2 to a desired height.

The second adhesive must have a higher hardness than the first adhesive, but need not allow for as accurate coating as the first adhesive. Therefore, the second adhesive can be a thermosetting adhesive, as well as a UV cure adhesive.

Although the above configurations are preferable for most applications, they are not limiting upon the scope of the invention.

First Embodiment

A first embodiment of the present invention will be described with reference to FIGS. 1 to 5.

FIG. 1 is a top view and FIG. 2 is a side view of an actuator portion according to the first embodiment of the present invention. Referring to FIGS. 1 and 2, a lens holder 4 has mounted thereon an objective lens 1, first protrusions 2 formed of a first adhesive, second protrusions 3 formed of a second adhesive, an AF coil (not shown), and TR coils 5 (5a to 5d). The lens holder 4 is attached to a dumping holder 10 by a suspension wire 8 and a T wire 9. The above attaching members are formed of various adhesives and solder. As shown in the side view of FIG. 2, the first protrusions 2, which are formed of the first adhesive, protrude toward the optical disc 13 (upward) and have a height (or thickness) T1 of approximately 0.25 mm. The second protrusions 3, which are formed of the second adhesive, also protrude toward the optical disc 13 (upward) and have a height (or thickness) T2 of approximately 0.1 mm. That is, the tips of the second protrusions 3 are approximately 0.15 mm lower than the tips of the first protrusions 2 but higher than the top surfaces of the objective lens 1 and the lens holder 4. The working distance WD is approximately 0.6-0.8 mm. It should be noted that the height T1 of the first protrusions 2 is determined so as to ensure the following. If the lens holder 4 cannot maintain within the working distance (WD) from the surface of the optical disc 13 (for example, as a result of the fact that tracking has failed during the focusing operation) and the lens holder 4 is moved toward the optical disc 13, the height T1 of the first protrusions 2 is a height that before the objective lens 1 and the lens holder 4 contact with the optical disc 13, the first protrusions 2 formed of the first adhesive contact with the optical disc 13, and when a focal distance between the optical disc 13 and the objective lens 1 becomes minimum value at the time of initiation of a read or write operation on the disc or during tacking across the disc, which has an axial run out, the first protrusions 2 formed of the first adhesive do not contact with the optical disc 13. That is, the first protrusions 2 do not contact the optical disc 13 if the lens holder 4, or the objective lens 1, is located at a distance at least as great as the minimum allowable distance from the optical disc 13. Since the focus servo systems of different optical disc drive apparatuses differ in characteristics and performance, the above height (or thickness) T1 of the first protrusions 2 formed of the first adhesive must be determined for each optical disc drive apparatus.

Since the first protrusions 2 (formed of the first adhesive) may contact the rotating optical disc 13 if the focus servo system of the optical pickup device does not function as intended, the first adhesive preferably has a considerably lower hardness (e.g., a Shore A hardness of approximately 50 or less) or a considerably lower modulus of elasticity (e.g., approximately 30 MPa or less) than polycarbonate which is used to form the optical disc. That is, the first adhesive is preferably a condensation-polymerized silicone adhesive, which allows for accurate coating and which has low tackiness and hardens on exposure to moisture in the atmosphere, or alternatively a UV cure adhesive (acrylic- or epoxy-based).

The above second protrusions 3 (formed of the second adhesive) are used to prevent the objective lens 1 and the lens holder 4 from contacting the optical disc 13 if the first protrusions 2 are elastically deformed as a result of a strong shock being imparted to the optical disc drive apparatus. Therefore, the second adhesive need not have as low a hardness as the first adhesive. Specifically, the second adhesive preferably has a hardness (e.g., a Shore D hardness of approximately 70 or less) higher than that of the first adhesive and lower than that of polycarbonate, or preferably has a lower modulus of elasticity (e.g., approximately 800 MPa or less) than polycarbonate. The second adhesive must have a higher hardness than the first adhesive, but need not allow for as accurate coating as the first adhesive. Therefore, the second adhesive can be a thermosetting adhesive, as well as a UV cure adhesive.

Some adhesives contain a filler such as silica material that has a higher hardness than polycarbonate (which is used to form the optical disc) and that has a particle size of 10 μm or more. If the first and second adhesives contain such a filler, the first and second protrusions (formed of the first and second adhesives, respectively) may damage the surface of the optical disc 13 on contact depending on the shape of the filler and the way in which these protrusions contact the optical disc 13, even if each adhesive has a hardness as described above. Therefore, when selecting the first and second adhesives, it is necessary to take into account the material and particle size of the filler, as well as the average hardness of the adhesives. Suitable types of fillers include, of course, granular organic fillers, which do not cause damage to the surface of the optical disc. It should be noted that the above first and second adhesives preferably do not contain a filler having a higher hardness than polycarbonate which is used to form the optical disc.

The lens holder 4 is usually made of an adhesion resistant polymer such as a liquid crystal polymer, since it requires accurate molding. Therefore, it is desirable to treat the surface of the lens holder 4 to facilitate its adhesion.

The following describes desirable positions of the first protrusions 2 and the second protrusions 3. The first protrusions 2 formed of the first adhesive are subjected to a large frictional force upon contact with the optical disc 13. Therefore, the second protrusions 3 are preferably disposed in close contact with the downstream side of the first protrusions 2 relative to the tangential direction of rotation of the optical disc 13 (i.e., the x-axis direction), as shown in FIGS. 1 and 2. That is, the second protrusions 3 having a high hardness or a high modulus of elasticity are in close contact with the first protrusions 2 having a low hardness or a low modulus of elasticity. This arrangement prevents cohesion failure of the first adhesive and hence detachment or breakage of the first protrusions 2 even if the first protrusions 2 come into contact with the rotating optical disc 13, since the second protrusions 3 are disposed on the downstream side of the first protrusions 2 relative to the direction of the frictional force. Especially, in high-speed writing, the optical disc 13 rotates at very high speed (5000 rpm or more), meaning that if the first protrusions 2 formed of the first adhesive contact the optical disc 13, material is removed from the surfaces of the first protrusions 2, even though the optical disc 13 is not damaged. In such a case, the second protrusions 3 formed of the second adhesive function to hold the removed material if they are disposed on the downstream side of the first protrusions 2 relative to the tangential direction of rotation of the optical disc 13. The tackiness of the second adhesive does not cause any great disadvantage.

On the other hand, depending on the way in which the first protrusions 2 contact the optical disc 13, the frictional force may cause stress concentration at the interface between the lens holder 4 and the upstream sides of the first protrusions 2 relative to the tangential direction of rotation of the optical disc 13 (i.e., the x-axis direction). In such a case, the second protrusions 3 may be disposed in close contact with the upstream side of the first protrusions 2 relative to the direction of rotation of the optical disc 13 as shown in FIG. 3 if the interface strength between the lens holder 4 and the first protrusions 2 is low.

As described above, the second protrusions 3 formed of the second adhesive are preferably disposed in close contact with either the upstream or downstream side of the first protrusions 2 (formed of the first adhesive) relative to the direction of rotation of the optical disc 13. However, the second protrusions 3 may be disposed on both sides of the first protrusions 2. Further, in the case where the first protrusions 2 formed of the first adhesive are very firmly adhered to the lens holder 4 (or where the first adhesive can be applied to large areas on the surface of the lens holder 4 to form the first protrusions 2), the second protrusions 3 may be spaced from the first protrusions 2, as shown in FIG. 4. Further, each second protrusion 3 and the corresponding first protrusion(s) 2 may not be in a line in the tangential direction of rotation of the optical disc 13. FIG. 5 shows such an example. It should be noted that there are preferably at least two first protrusions 2 formed of the first adhesive and at least two second protrusions 3 formed of the second adhesive if it is possible to finely adjust the amount of adhesive applied to form each protrusion.

Second Embodiment

Figure 6:
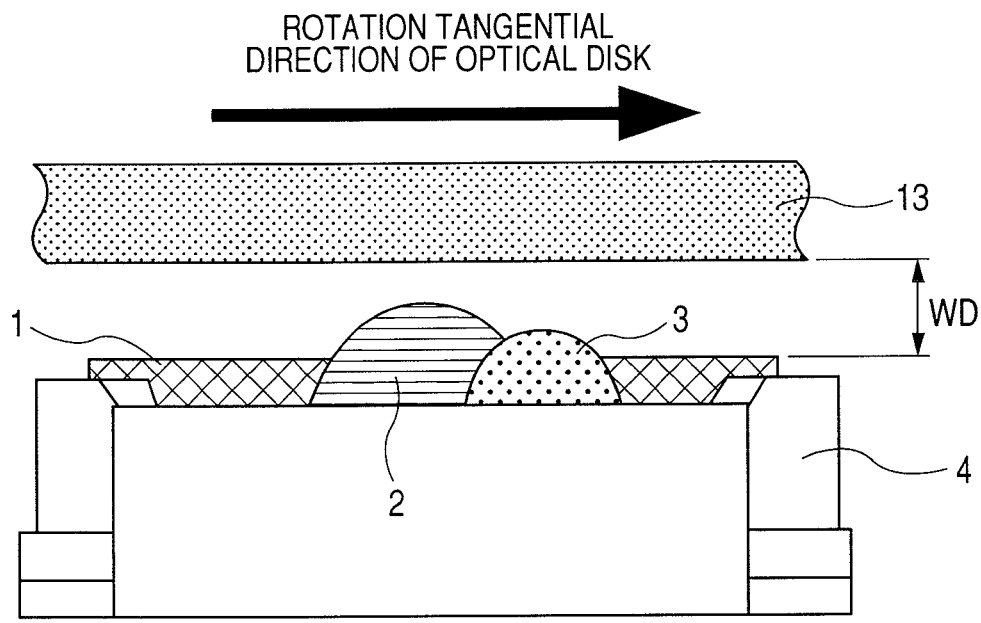
FIG. 6 is a cross-sectional view of the lens holder portion of a first example of the actuator portion of an optical pickup device according to a second embodiment of the present invention.
Figure 7:
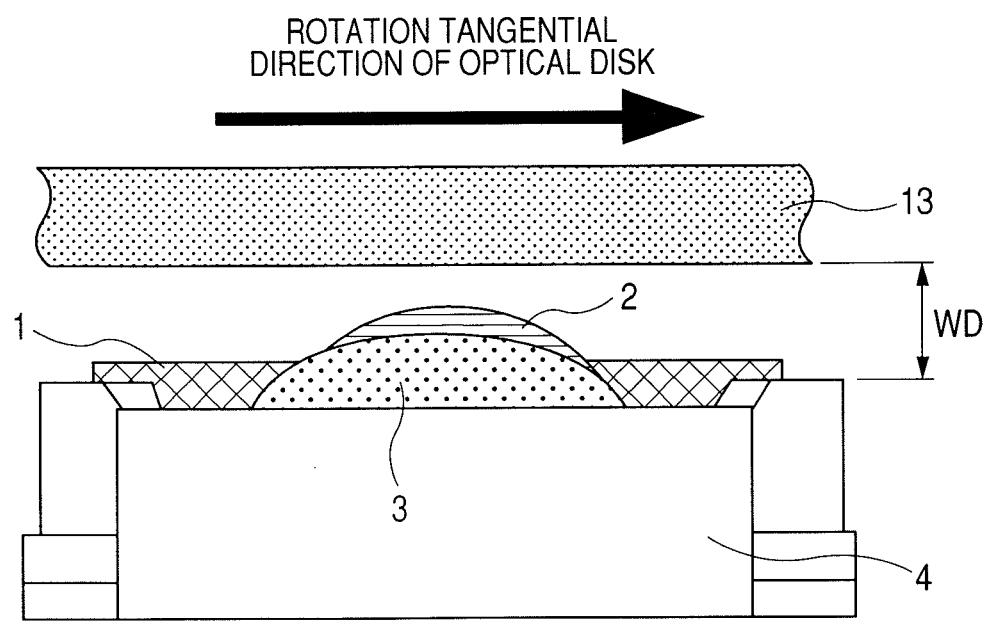
FIG. 7 is a cross-sectional view of the lens holder portion of a second example of the actuator portion of the second embodiment.

A second embodiment of the present invention will be described with reference to FIGS. 6 and 7. FIGS. 6 and 7 are side views of actuator portions according to the second embodiment of the present invention. The actuator portions of the present embodiment differ from those of the first embodiment in that the second protrusions 3 are first formed by application of the second adhesive before forming the first protrusions 2 by application of the first adhesive. This approach may be advantageous depending on the types of adhesive materials used. For example, UV cure adhesives and thermosetting adhesives generally tend to exhibit poor adhesion to silicone resins (or silicone-based adhesives). On the other hand, silicone resins may exhibit good adhesion to UV cure adhesives and thermosetting adhesives. Therefore, when the first adhesive is a condensation-polymerized silicone resin (a silicone-based adhesive), the second adhesive (a UV cure adhesive or a thermosetting adhesive) may be applied before applying the first adhesive. This ensures good adhesion between the first protrusions 2 formed of the first adhesive and the second protrusions 3 formed of the second adhesive. It should be noted that the second adhesive may be applied to the upstream side of the first protrusions 2 (formed of the first adhesive) relative to the direction of rotation of the optical disc 13, with the same effect.

It should be noted that since the first protrusions 2 must be accurately formed to a desired height (or thickness), the first adhesive must allow for accurate coating. This means that the first adhesive is preferably a condensation-polymerized silicone resin having a very low tackiness, or a UV cure adhesive. However, the condensation-polymerized silicone resin or the UV cure adhesive may exhibit poor adhesion to the lens holder 4. To overcome this problem, the second adhesive (or the second protrusions 3) may be interposed between the first adhesive and the lens holder 4 to increase the adhesion strength, as shown in FIG. 7. Further, in this case, too, the second protrusions 3 (formed of the second adhesive having a higher hardness or a higher modulus of elasticity than the first adhesive) may be formed such that their tips are higher than the top surfaces of the lens holder 4 and the objective lens 1 to make the optical pickup device shock-resistant.

Third Embodiment

Figure 8:
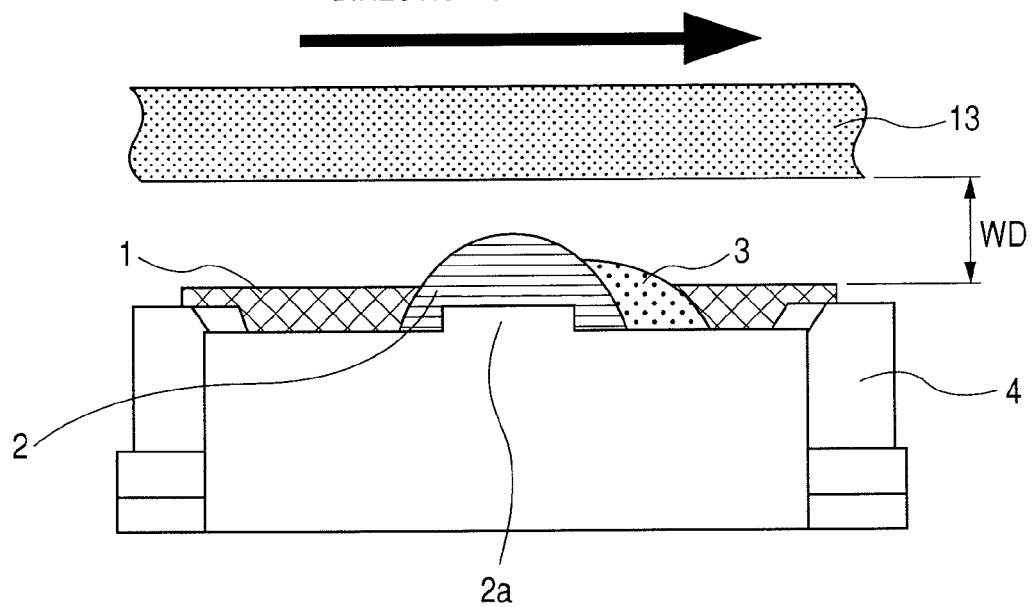
FIG. 8 is a cross-sectional view of the lens holder portion of a first example of the actuator portion of an optical pickup device according to a third embodiment of the present invention.
Figure 9:
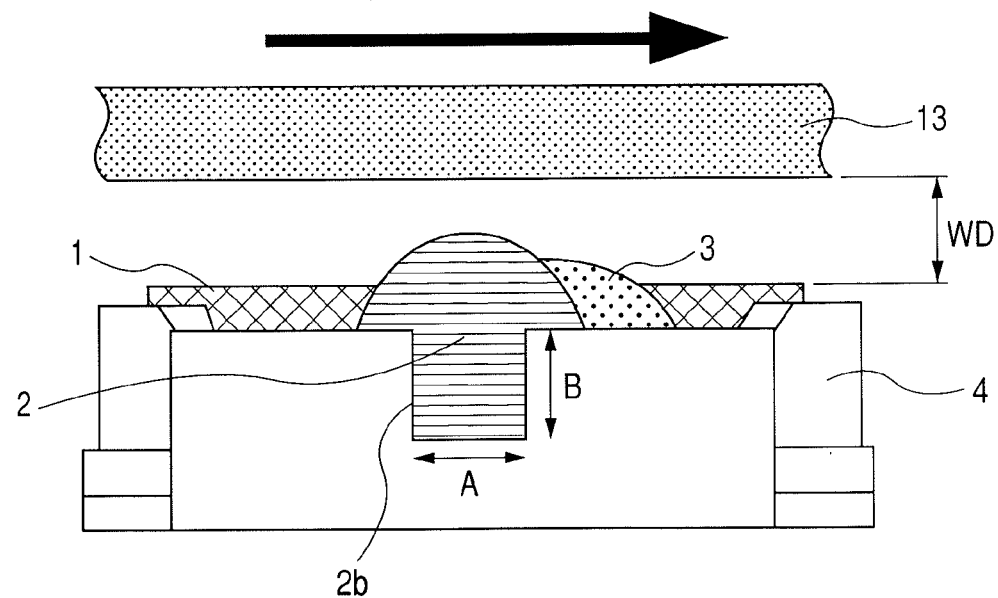
FIG. 9 is a cross-sectional view of the lens holder portion of a second example of the actuator portion of the third embodiment.
Figure 10:
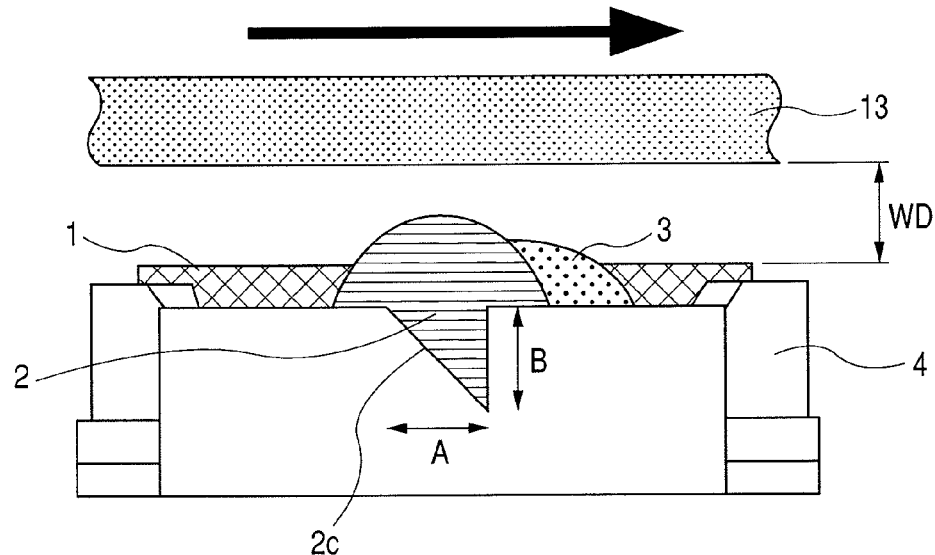
FIG. 10 is a cross-sectional view of the lens holder portion of a third example of the actuator portion of the third embodiment.

A third embodiment of the present invention will be described with reference to FIGS. 8 to 10. FIGS. 8 to 10 are side views of actuator portions according to the third embodiment of the present invention. The actuator portions of the present embodiment differ from those of the first and second embodiments in that the area to which the first adhesive is applied includes a convex portion 2a or a concave portion 2b or 2c, as shown in FIGS. 8 to 10. These convex and concave portions can be used to position the first adhesive when it is applied to the lens holder 4. Especially, the concave portions 2b and 2c may be grooves that extend in the direction of movement of the optical pickup device and pass through opposing sides of the lens holder 4 that sandwich the objective lens 1. This arrangement is preferred since it facilitates escape of moisture and irradiation of the adhesive with UV light. This prevents any portion of the adhesive from being left unhardened, or reduces the time required to harden the adhesive completely. Further, the above penetrating portions facilitate escape of air bubbles from the applied adhesive, which is another advantage of the present embodiment.

Further, the concave portions 2b and 2c formed in the lens holder 4 may be such that their height B perpendicular to the tangential direction of rotation of the optical disc 13 is larger than their width A parallel to that direction (B>A), as shown in FIGS. 9 and 10. This results in an increased adhesion area between the lens holder 4 and the first adhesive. Furthermore, when the first protrusions 2 come into contact with the surface of the optical disc 13 and are subjected to frictional force, the portions of the first adhesive in these concave portions can function as an anchor. It should be noted that the concave portion 2b having a rectangular cross section shown in FIG. 9 provides a larger adhesion area between the lens holder 4 and the first adhesive than the concave portion 2c having a triangular cross section shown in FIG. 10. Further, there may be a plurality of convex portions 2a and pluralities of concave portions 2b and 2c.

Figure 11:
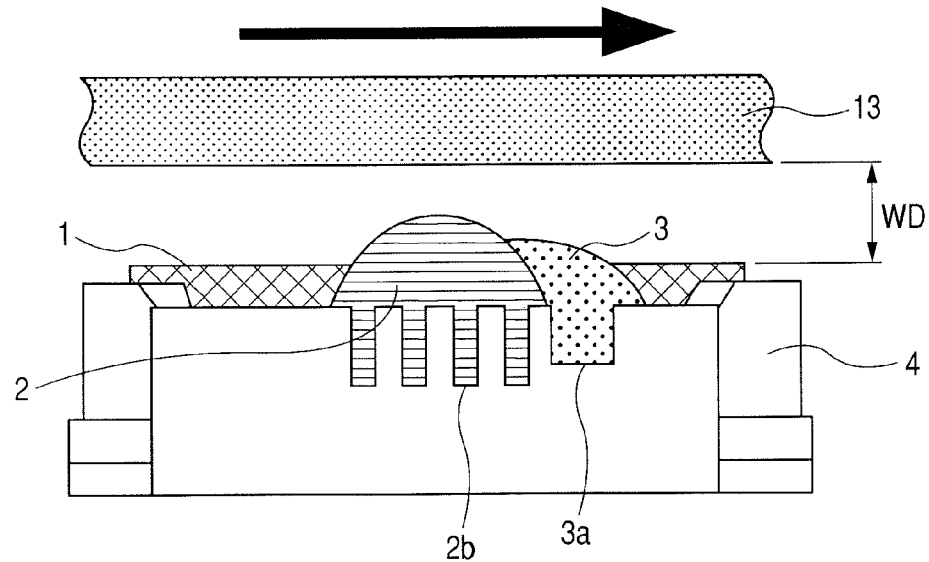
FIG. 11 is a cross-sectional view of the lens holder portion of a fourth example of the actuator portion of the third embodiment.

In addition to the area to which the first adhesive is applied, the area to which the second adhesive is applied may also include a concave portion 3a or a convex portion (not shown) as shown in FIG. 11. That is, at least one of these areas may include a concave portion or a convex portion. The concave and convex portions can be of any shape including the simple shapes described above if they do not prevent hardening of the adhesives. Further, the concave portion 3a or convex portion (not shown) formed in the area to which the second adhesive is applied may also extend in the direction of movement of the optical pickup device and pass through opposing sides of the lens holder 4 that sandwich the objective lens 1. This arrangement enables the second adhesive (a UV cure adhesive) to harden by absorbing the UV light through the opposing sides of the lens holder 4 that extend perpendicular to the direction of movement of the optical pickup device (which is perpendicular to the plane of the paper in FIG. 11.) This prevents any portion of the adhesive from being left unhardened, and reduces the time required to harden the adhesive completely. Further, the above penetrating portion facilitates escape of air bubbles from the applied adhesive, which is another advantage of the present embodiment.

While the invention has been described with reference to optical pickup devices of preferred embodiments, it is to be understood that the invention is not limited to these embodiments and various alterations may be made thereto without departing from the spirit and scope of the invention.

With the recent trend toward smaller and thinner optical pickup devices, there has been a need to write to and read from optical recording media, such as DVDs, Blu-ray discs, and HD-DVDs conforming to various standards, at high speed. Any single optical pickup device adapted to simultaneously meet many of such standards has the problem of a reduced design margin, e.g., a reduced working distance (WD) between the objective lens and the optical disc. In order to prevent contact or collision between the objective lens and the optical disc, conventional optical pickup devices include a special molded disc protector fixed to the disc holder. However, these optical pickup devices are difficult to assemble and high in cost. On the other hand, the optical pickup devices of the present embodiment include a disc protector formed simply by applying adhesives with precision. This disc protector has functionality equal to or higher than the above conventional molded disc protector, making it possible to enhance the reliability and quality of the optical pickup devices.

Thus, the present invention can be applied to small thin optical pickup devices used to write to and read from optical recording media, such as DVDs, Blu-ray discs, and HD-DVDs conforming to various standards, at high speed.

While we have shown and described several embodiments in accordance with the present invention, it is understood that the same is not limited thereto but is susceptible of numerous changes and modifications as known to those skilled in the art, and we therefore do not wish to be limited to the details shown and described herein but intended to cover all such changes and modifications as are encompassed by the scope of the appended claims.

What is claimed is:

1. An optical pickup device for writing and reading data to and from an optical disc by means of a laser beam, said optical pickup device comprising:
    an objective lens for focusing said beam onto said optical disc;
    a lens holder for holding said objective lens;
    a moving drive portion for moving said lens holder in a focusing direction and in a tracking direction; and
    a disc protector including a plurality of first protrusions and at least one second protrusion disposed on said lens holder to prevent said objective lens and said lens holder from contacting said optical disc,
    wherein said first protrusions protrude toward said optical disc and are formed by applying a first adhesive to a plurality of areas of said lens holder, said first protrusions being arranged at different locations in said tracking direction such that said objective lens is sandwiched between said first protrusions, wherein said at least one second protrusion protrudes toward said optical disc and is formed by applying a second adhesive to at least one area of said lens holder, wherein a tip of said at least one second protrusion is closer to said optical disc than a top end or surface of said objective lens and a top end or surface of said lens holder, and wherein tips of said first protrusions are closer to said optical disc than said tip of said at least one second protrusion.

2. The optical pickup device as claimed in claim 1, wherein said at least one second protrusion has a hardness or a modulus of elasticity higher than that of said first protrusions and lower than that of polycarbonate.

3. The optical pickup device as claimed in claim 1, wherein at least a portion of said at least one second protrusion is in contact with at least a portion of one of said first protrusions.

4. The optical pickup device as claimed in claim 1, wherein at least a portion of said at least one second protrusion is in contact with at least an upstream or downstream portion of one of said first protrusions relative to a tangential direction of rotation of said optical disc.

5. The optical pickup device as claimed in claim 4, wherein a concave portion or a convex portion is formed in either said plurality of areas to which said first adhesive is applied, or said at least one area to which said second adhesive is applied, or both, said concave portion being filled with a respective one of said first and second adhesives.

6. The optical pickup device as claimed in claim 5, wherein said concave or convex portion extends in said tracking direction and penetrates through opposing sides of said lens holder that sandwich said objective lens therebetween.

7. The optical pickup device as claimed in claim 5, wherein the maximum depth of said concave portion is larger than the maximum width of said concave portion, said maximum depth being measured in a direction perpendicular to the plane of said optical disc, and said maximum width being measured in said tangential direction of rotation of said optical disc.

8. The optical pickup device as claimed in claim 1, wherein said first adhesive is a condensation-polymerized silicone adhesive or a UV cure adhesive.

9. The optical pickup device as claimed in claim 8, wherein said second adhesive is a UV cure adhesive or a thermosetting adhesive.

10. The optical pickup device as claimed in claim 9, wherein said first and second adhesives do not contain a filler having a higher hardness than polycarbonate.

11. An optical disc drive apparatus comprising the optical pickup device as claimed in claim 1.

\* \* \* \* \*